United States Patent
Yi et al.

(10) Patent No.: US 9,907,094 B2
(45) Date of Patent: Feb. 27, 2018

(54) RANDOM ACCESS PROCEDURES IN A WIRELESS NETWORK EMPLOYING TDD SCHEME

(71) Applicant: LG Electronics Inc., Seoul (KR)

(72) Inventors: Seungjune Yi, Seoul (KR); Sunyoung Lee, Seoul (KR); Youngdae Lee, Seoul (KR)

(73) Assignee: LG Electronics Inc., Seoul (KR)

(*) Notice: Subject to any disclaimer, the term of this patent is extended or adjusted under 35 U.S.C. 154(b) by 162 days.

(21) Appl. No.: 15/022,207

(22) PCT Filed: Aug. 18, 2014

(86) PCT No.: PCT/KR2014/007625
§ 371 (c)(1),
(2) Date: Mar. 16, 2016

(87) PCT Pub. No.: WO2015/037835
PCT Pub. Date: Mar. 19, 2015

(65) Prior Publication Data
US 2016/0227585 A1    Aug. 4, 2016

Related U.S. Application Data

(60) Provisional application No. 61/878,049, filed on Sep. 16, 2013.

(51) Int. Cl.
*H04W 74/00* (2009.01)
*H04W 74/08* (2009.01)
(Continued)

(52) U.S. Cl.
CPC ...... *H04W 74/0833* (2013.01); *H04B 7/2656* (2013.01); *H04W 72/1268* (2013.01); *H04W 72/1273* (2013.01)

(58) Field of Classification Search
None
See application file for complete search history.

(56) References Cited

U.S. PATENT DOCUMENTS

2012/0082046 A1*  4/2012  Ho ................ H04W 52/367
                                              370/252
2012/0327821 A1   12/2012  Lin et al.
(Continued)

FOREIGN PATENT DOCUMENTS

WO    2012/083811 A1    6/2012
WO    2012/162877 A1    6/2012
WO    2013/002562 A2    1/2013

OTHER PUBLICATIONS

International Search Report and Written Opinion issued in corresponding International Patent Application No. PCT/KR2014/007625 dated Dec. 12, 2014.

*Primary Examiner* — Bunjob Jaroenchonwanit
(74) *Attorney, Agent, or Firm* — Morgan, Lewis & Bockius LLP

(57) ABSTRACT

The present invention relates to a wireless communication system. More specifically, the present invention relates to random access procedures in a wireless network employing TDD scheme. According to one aspect of the present invention, the user equipment (UE), receiving information a first time division duplex (TDD) uplink/downlink (UL/DL) subframe configuration and information on a second TDD UL/DL subframe configuration informing the UE of a change from the first TDD UL/DL subframe configuration, communicates with the network based on the second TDD UL/DL subframe configuration, but performs a random access procedure based on the first TDD UL/DL subframe configuration, when the random access procedure is initiated.

15 Claims, 12 Drawing Sheets

(51) Int. Cl.
 *H04B 7/26* (2006.01)
 *H04W 72/12* (2009.01)

(56) References Cited

U.S. PATENT DOCUMENTS

| | | |
|---|---|---|
| 2013/0044652 A1 | 2/2013 | Wang et al. |
| 2013/0279377 A1 | 10/2013 | Zhao et al. |
| 2014/0018124 A1* | 1/2014 | Ahn ............... H04W 24/10 455/522 |
| 2014/0112217 A1 | 4/2014 | Ahn et al. |
| 2014/0122957 A1* | 5/2014 | Charbit ............ H04B 7/2656 714/748 |
| 2015/0003345 A1* | 1/2015 | Kuo ............... H04W 52/365 370/329 |
| 2015/0036645 A1* | 2/2015 | Shin ............... H04L 5/001 370/329 |
| 2015/0163815 A1* | 6/2015 | Lei ............... H04W 16/10 370/280 |
| 2015/0195795 A1* | 7/2015 | Loehr ............ H04W 52/06 455/522 |
| 2015/0230286 A1* | 8/2015 | Feuersaenger .... H04W 72/1215 370/252 |
| 2016/0029239 A1* | 1/2016 | Sadeghi .......... H04W 24/10 370/252 |
| 2016/0029289 A1* | 1/2016 | Wang ............. H04B 7/155 370/315 |
| 2016/0198420 A1* | 7/2016 | Lee ............... H04B 7/2615 370/280 |
| 2016/0205635 A1* | 7/2016 | Kwon ............. H04W 52/146 455/522 |
| 2017/0070960 A1* | 3/2017 | Haim .............. H04W 52/146 |
| 2017/0223641 A1* | 8/2017 | Haim .............. H04W 52/365 |

* cited by examiner (a) Control-Plane Protocol Stack (b) User-Plane Protocol Stack

RANDOM ACCESS PROCEDURES IN A WIRELESS NETWORK EMPLOYING TDD SCHEME

TECHNICAL FIELD

The present invention relates to a wireless communication system and, more particularly, to random access procedures in a wireless network employing TDD scheme.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE

Technical Problem

An object of the present invention devised to solve the problem lies in a prior art. The technical problems solved by the present invention are not limited to the above technical problems and those skilled in the art may understand other technical problems from the following description.

Technical Solution

To achieve the above object, in one aspect of the present invention, a method of performing a random access to a network by a user equipment (UE) is provided. In this method, the UE receive information on a first time division duplex (TDD) uplink/downlink (UL/DL) subframe configuration; receives information on a second TDD UL/DL subframe configuration informing the UE of a change from the first TDD UL/DL subframe configuration; communicates with the network based on the second TDD UL/DL subframe configuration; performs a random access procedure based on the first TDD UL/DL subframe configuration, when the random access procedure is initiated. Preferably, the UE may communicate with the network based on the second TDD UL/DL subframe configuration, when the random access procedure is completed unsuccessfully. On the other hand, the UE may communicate with the network based on the first TDD UL/DL subframe configuration, when the random access procedure is completed successful.

In another aspect of the present invention, a user equipment (UE) performing a random access to a network is provided. The UE comprises: a transceiver configured to receive information on a first time division duplex (TDD) uplink/downlink (UL/DL) subframe configuration and information on a second TDD UL/DL subframe configuration informing the UE of a change from the first TDD UL/DL subframe configuration; and a processor connected to the transceiver and configured to perform a random access procedure based on the first TDD UL/DL subframe configuration, when the random access procedure is initiated while communicate with the network based on the second TDD UL/DL subframe configuration.

Preferably, the processor may be further configured to communicate with the network based on the second TDD UL/DL subframe configuration, when the random access procedure is completed unsuccessfully.

And, the processor may be further configured to communicate with the network based on the first TDD UL/DL subframe configuration, when the random access procedure is completed successful.

The above mentioned communicating with the network may comprise: monitoring a physical downlink control channel (PDCCH) on one or more downlink subframes according to the first or the second TDD UL/DL subframe configuration, and/or transmitting an uplink signal on one or more uplink subframes according to the first or the second TDD UL/DL subframe configuration.

The first TDD UL/DL subframe configuration may be received via system information, and/or the second TDD UL/DL subframe configuration may be received via a physical signaling. However, the second TDD UL/DL subframe configuration may be received via any other signaling other than the system information (e.g. dedicated RRC signaling).

The second TDD UL/DL subframe configuration may be more frequently signaled than the first TDD UL/DL subframe configuration. And, the second TDD UL/DL subframe configuration may allocate more downlink subframes than the first TDD UL/DL subframe configuration.

Preferably, the above random access procedure may be a non contention based random access procedure.

It is to be understood that both the foregoing general description and the following detailed description of the present invention are exemplary and explanatory and are intended to provide further explanation of the invention as claimed.

Advantageous Effects

According to the present invention, the communication can be performed by using adaptable TDD UL/DL subframe structure. Further, the network can reduce miscommunication due to this dynamic TDD UL/DL subframe configuration.

It will be appreciated by persons skilled in the art that that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

BEST MODE

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
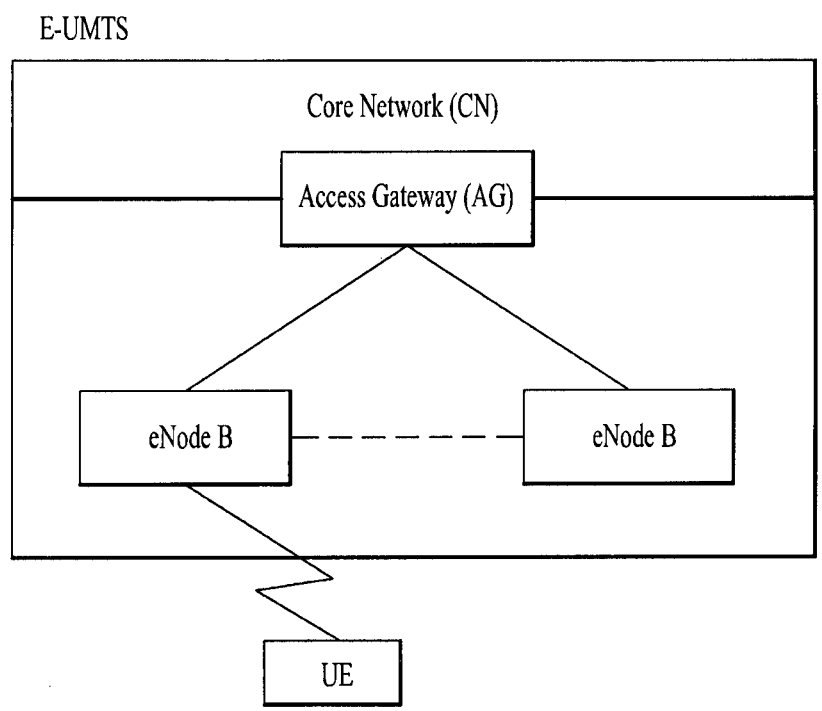
FIG. 1 is a diagram showing a network structure of an Evolved Universal Mobile Telecommunications System (E-UMTS) as an example of a wireless communication system.
Figure 2A:
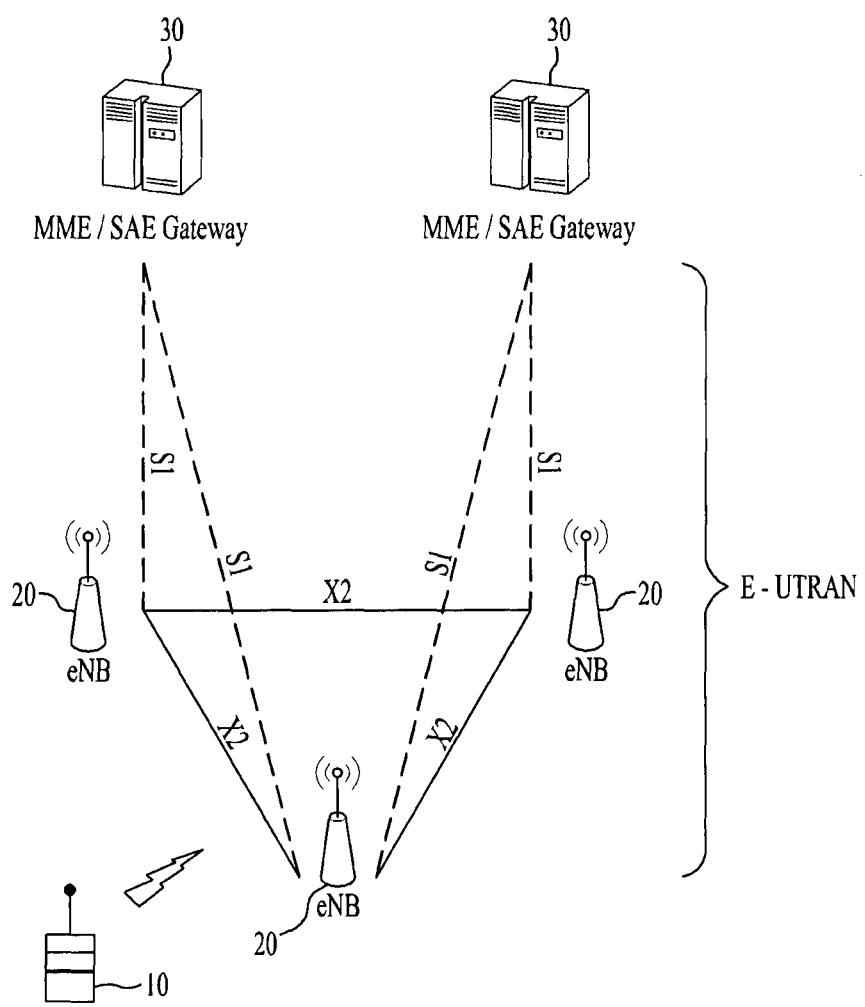
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
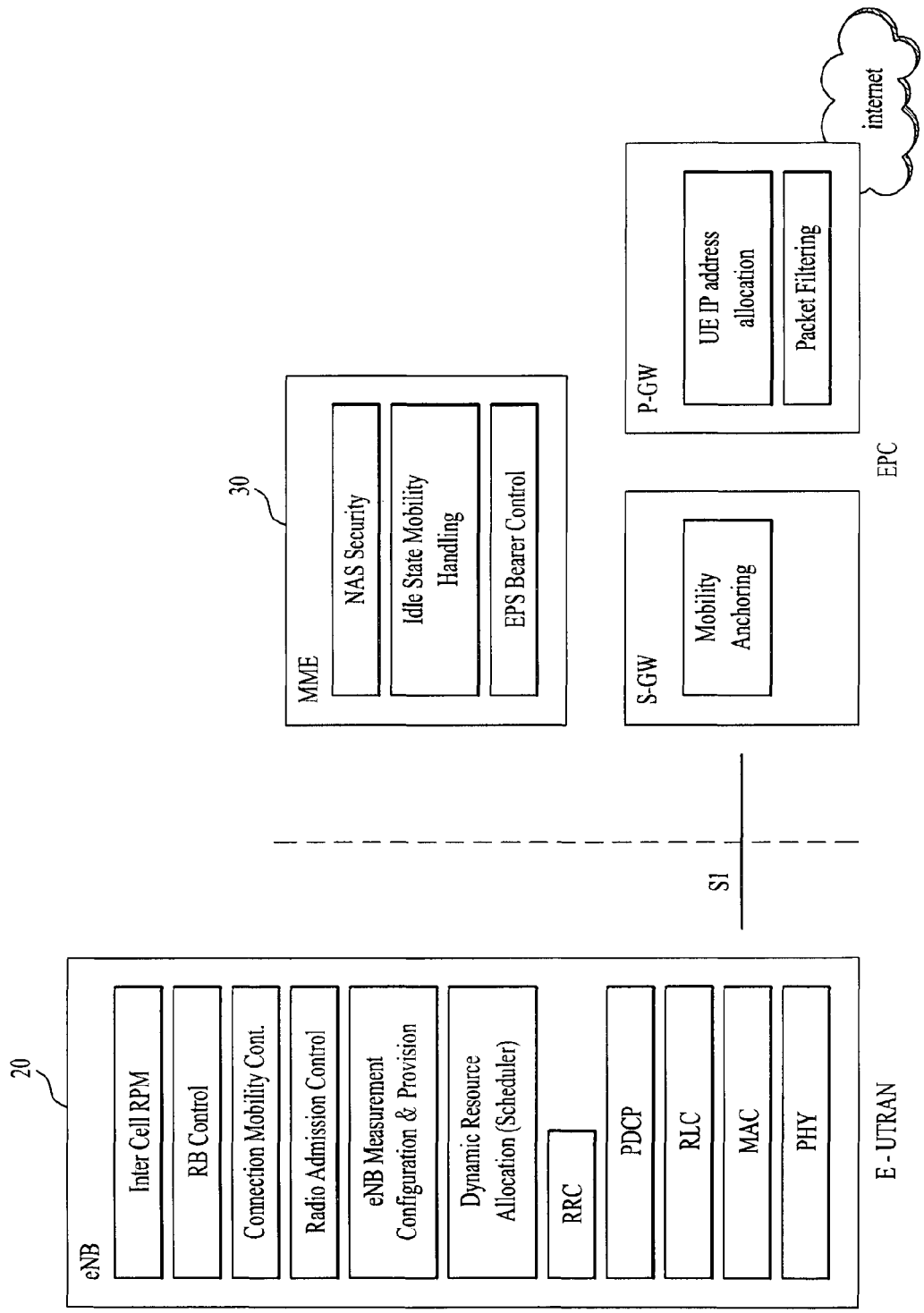
FIG. 2B is a block diagram depicting architecture of a typical E-UTRAN and a typical EPC.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated in FIG. 2B, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
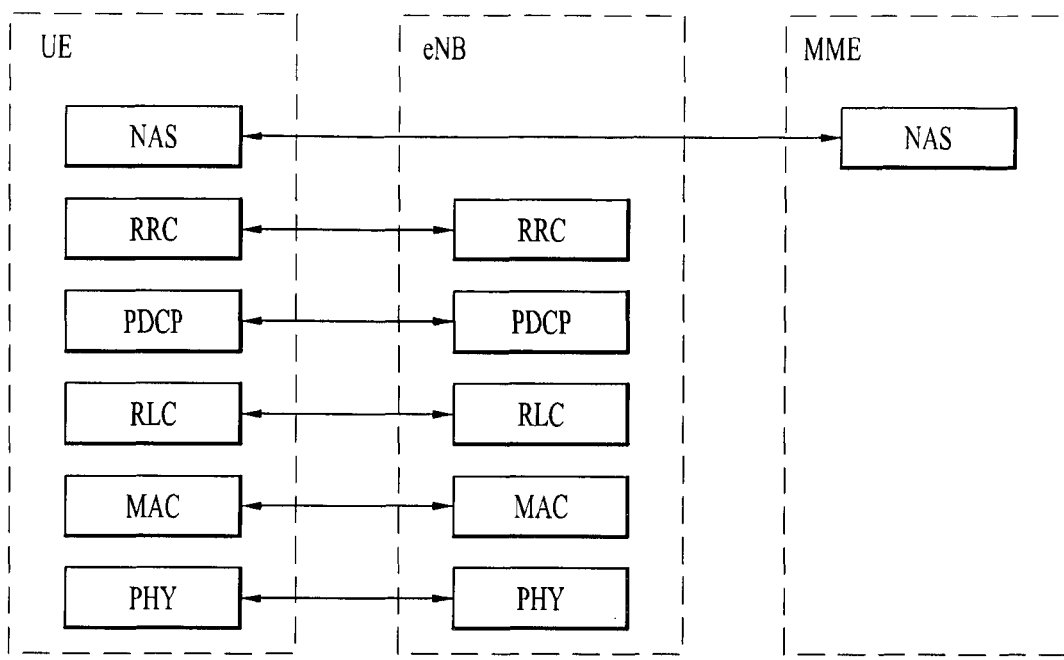
FIG. 3 is a diagram showing a control plane and a user plane of a radio interface protocol between a UE and an E-UTRAN based on a 3rd generation partnership project (3GPP) radio access network standard.
Figure 3:
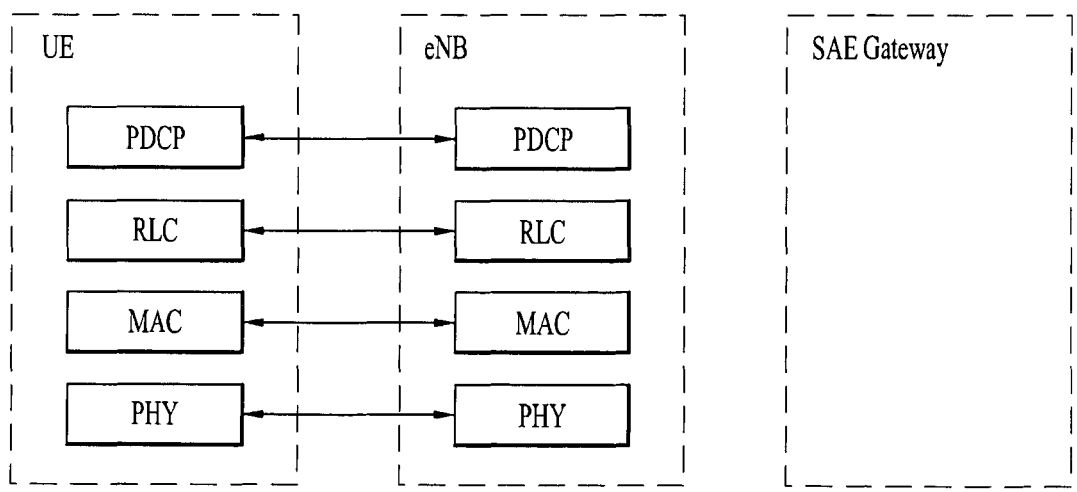

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
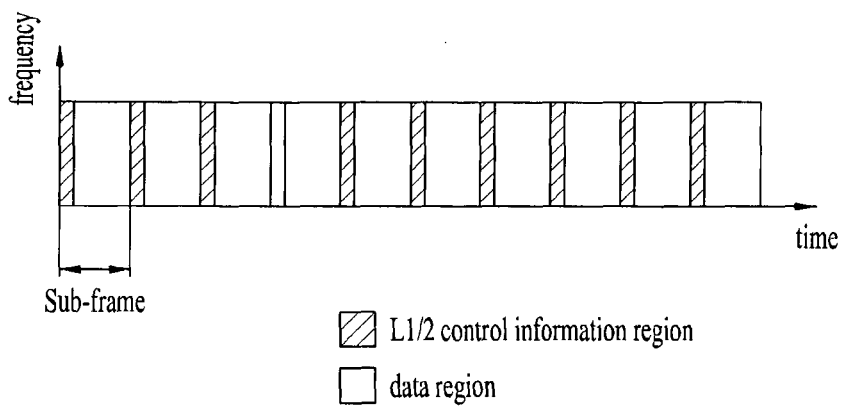
FIG. 4 is a diagram of an example physical channel structure used in an E-UMTS system.

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

In the communication system where the present invention is to be applied, there may be 2 frame structures both for FDD and TDD schemes.

Figure 5:
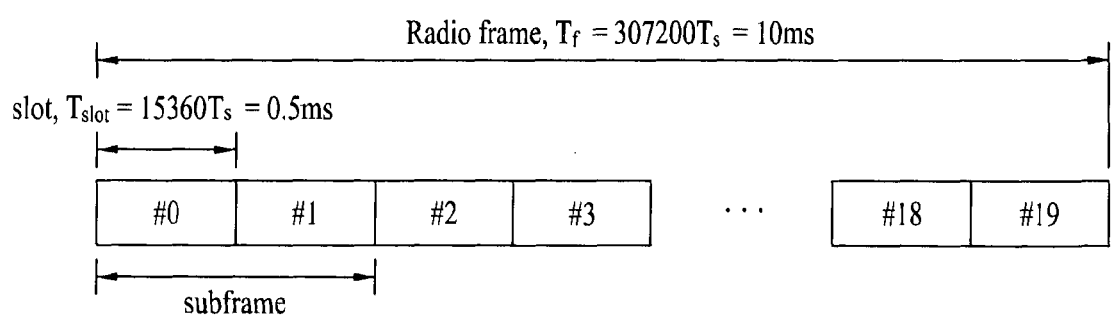
FIG. 5 is a diagram showing the structure of a radio frame used in a Long Term Evolution (LTE) system.

FIG. 5 is a diagram showing the structure of a radio frame used in an LTE system using FDD scheme.

Referring to FIG. 5, the radio frame has a length of 10 ms (327200×Ts) and is divided into 10 subframes having the same size. Each of the subframes has a length of 1 ms and includes two slots. Each of the slots has a length of 0.5 ms (15360×Ts). Ts denotes a sampling time, and is represented by Ts=1/(15 kHz×2048)=3.2552×10-8 (about 33 ns). Each of the slots includes a plurality of OFDM symbols in a time domain and a plurality of Resource Blocks (RBs) in a frequency domain. In the LTE system, one RB includes 12 subcarriers×7 (or 6) OFDM symbols. A transmission time interval (TTI) that is a unit time for transmission of data may be determined in units of one or more subframes. The structure of the radio frame is purely exemplary and thus the number of subframes included in the radio frame, the number of slots included in a subframe, or the number of OFDM symbols included in a slot may be changed in various ways.

This type of frame structure can be named as frame structure type 1, and it is applicable to both full duplex and half duplex FDD schemes.

Figure 6:
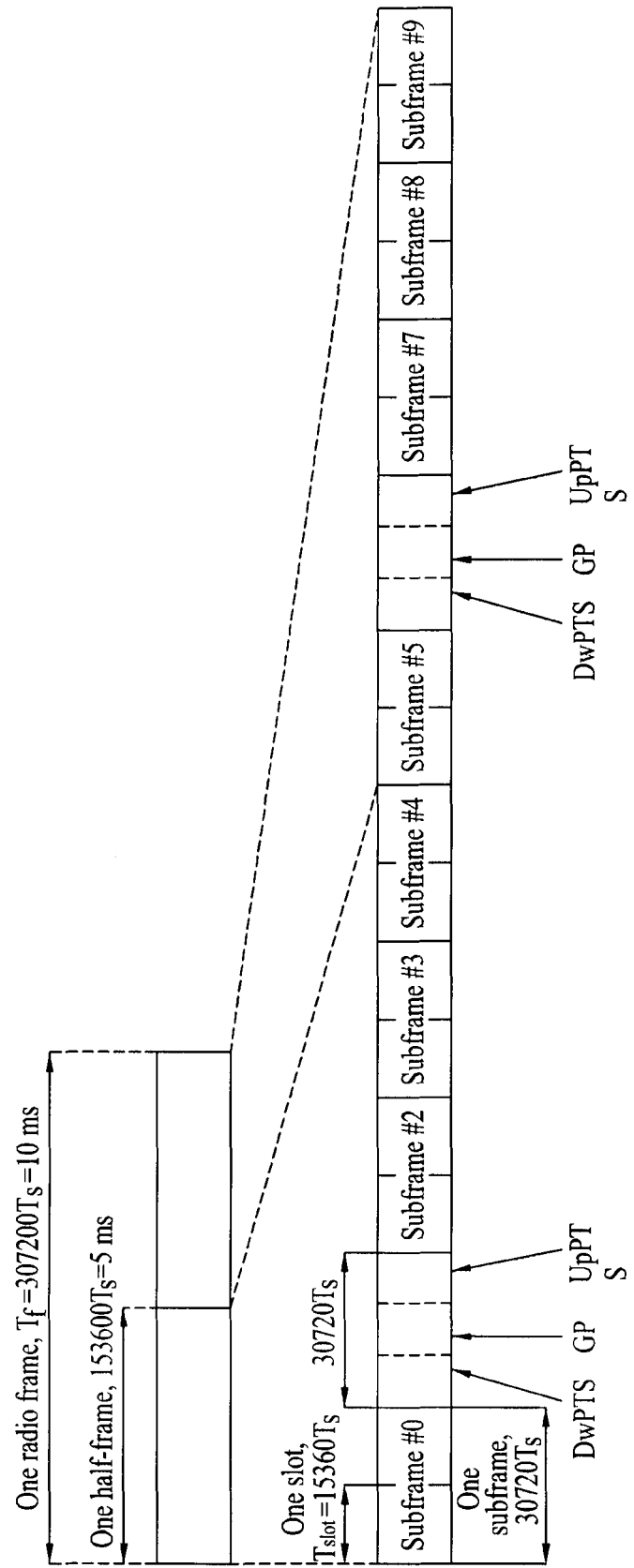
FIG. 6 is a diagram showing the structure of a radio frame used in an LTE system using TDD scheme.

FIG. 6 is a diagram showing the structure of a radio frame used in an LTE system using TDD scheme.

Frame structure shown in FIG. 6 can be referred to as frame structure type 2. Frame structure type 2 is applicable to TDD. Each radio frame of length $T_f=307200 \cdot T_s=10$ ms consists of two half-frames of length $153600 \cdot T_s=5$ ms each. Each half-frame consists of five subframes of length $30720 \cdot T_s=1$ ms.

The supported uplink-downlink configurations are listed in Table 1.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, for each subframe in a radio frame, "D" denotes the subframe is reserved for downlink transmissions, "U" denotes the subframe is reserved for uplink transmissions and "S" denotes a special subframe with the three fields DwPTS, GP and UpPTS.

The length of DwPTS and UpPTS is given by Table 2 subject to the total length of DwPTS, GP and UpPTS being equal to $30720 \cdot T_s=1$ ms. Each subframe i is defined as two slots, 2i and 2i+1 of length $T_{slot}=15360 \cdot T_s=0.5$ ms in each subframe.

TABLE 2

| | | Normal cyclic prefix in downlink | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

Uplink-downlink configurations with both 5 ms and 10 ms downlink-to-uplink switch-point periodicity are supported.

In case of 5 ms downlink-to-uplink switch-point periodicity, the special subframe exists in both half-frames. In case of 10 ms downlink-to-uplink switch-point periodicity, the special subframe exists in the first half-frame only. Subframes 0 and 5 and DwPTS are preferably reserved for downlink transmission. UpPTS and the subframe immediately following the special subframe are always reserved for uplink transmission.

The above explained TDD UL/DL configuration is signaled via system information. Specifically, the TDD configuration information can be signaled via System Information Block Type 1 message which is transmitted from the network to the UE.

However, there is a need for changing the TDD UL/TD subframe configuration based on the amount of traffic to/from the UE in each direction. And, the adaptable of the TDD UL/DL subframe configuration based on the needs of specific UE(s) is difficult to be realized by using the system information. So, one aspect of the present invention proposes to use a scheme where TDD UL/DL subframe configuration can be easily changed. This scheme can be referred to as eIMTA (enhanced Interference Management and Traffic Adaptation).

Figure 7:
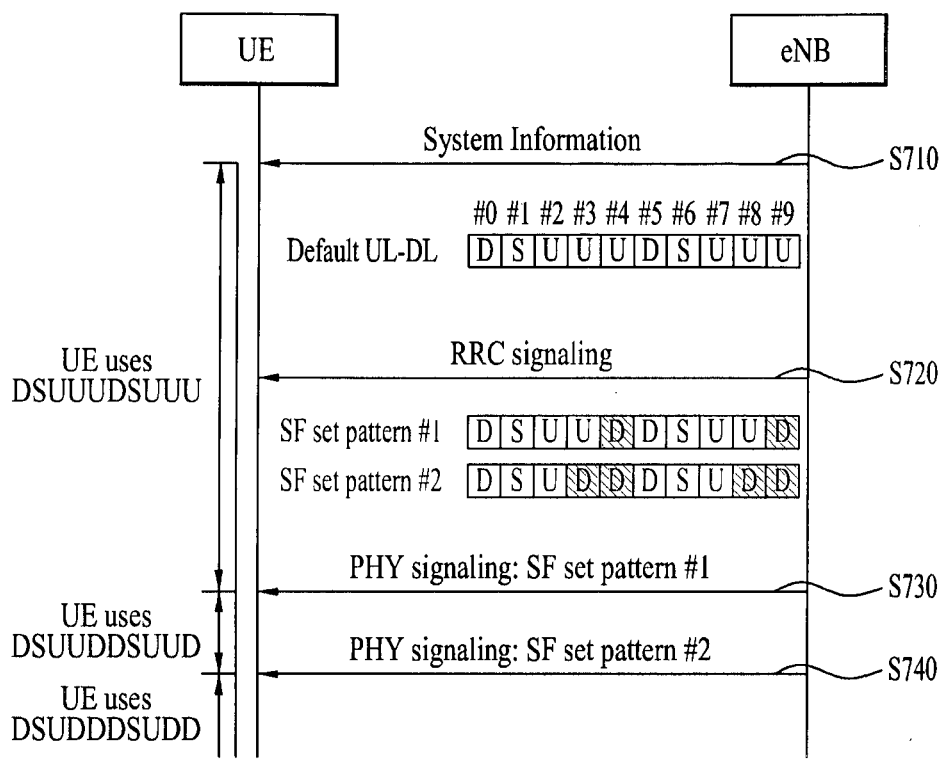
FIG. 7 shows an exemplary process for eIMTA scheme according to one example of the present invention.

FIG. 7 shows an exemplary process for eIMTA scheme according to one example of the present invention.

As explained above, by using eIMTA scheme in TDD system, the UL-DL configuration can be changed based on the amount of traffic in each direction.

First, the default UL-DL configuration for TDD system may be provided in System Information (S710). This configuration is cell-specific, and does not change unless the cell is reconfigured. Thus, it is called default UL-DL configuration. The default UL-DL configuration is the configuration explained above as signaled via System Information Block Type 1.

In this example, the subframes #0 and #5 are downlink subframes based on the default configuration, the subframes #1 and #6 are special subframes (DwPTS) which can also be used for downlink transmission, and the subframes #2, #3, #4, #7, #8, and #9 are uplink subframes. This pattern is applied to each radio frame.

With eIMTA according to one example of the present invention configured, if the eNB wants to increase downlink transmission to a UE, the eNB may provides SF (Subframe) set pattern information to the UE by the dedicated RRC signaling (e.g. RRC Connection Reconfiguration message) (S720). The eNB can provide multiple SF set patterns to the UE. In this example, the SF set pattern #1 changes subframes #4 and #9 to DL subframes, and the SF set pattern #2 changes #3, #4, #8, and #9 to DL subframes, compared to the default UL/DL configuration. The eNB may also provide the start time and duration of each SF set pattern.

After providing the SF set pattern information, the eNB can dynamically change the UL-DL configuration of the UE depending on the actual amount of data. The dynamic change can be realized by PHY signaling such as PDCCH signaling.

In this example, the eNB may transmit L1 signaling to use SF set pattern #1 (S730) instead of default UL/DL configuration. On another instance, the eNB may transmit L1 signaling to command the UE to use SF pattern #2 (S740) by considering the amount of traffic to be transmitted.

TDD offers flexible deployments without requiring a pair of spectrum resources. LTE TDD allows for asymmetric UL-DL allocations by providing seven different semi-statically configured uplink-downlink configurations. These allocations can provide between 40% and 90% DL subframes. The semi-static allocation may or may not match the instantaneous traffic situation. Evaluations reveals significant performance benefits by allowing TDD UL-DL reconfiguration based on traffic adaptation in small cells.

Also, in order to ovoid interference caused by this TDD UL-DL reconfiguration, one aspect of the present invention proposes to use adequate interference avoidance scheme with this TDD UL-DL reconfiguration. The interference avoidance schemes to be used can be one or more of (a) cell clustering interference mitigation, (b) scheduling dependent interference mitigation, (c) interference mitigation based on eICIC/FeICIC schemes, and (d) interference suppressing interference mitigation.

By using eIMTA scheme, the network can acquires performance benefits. But, the applicant of the present invention considered that there can be a mismatch on the TDD UL/DL subframe configuration between a specific UE and eNB. One of example for this mismatch can be happened during the random access procedure. Hereinafter, the random access procedure in terms of TDD UL/DL configuration will be explained.

Figure 8:
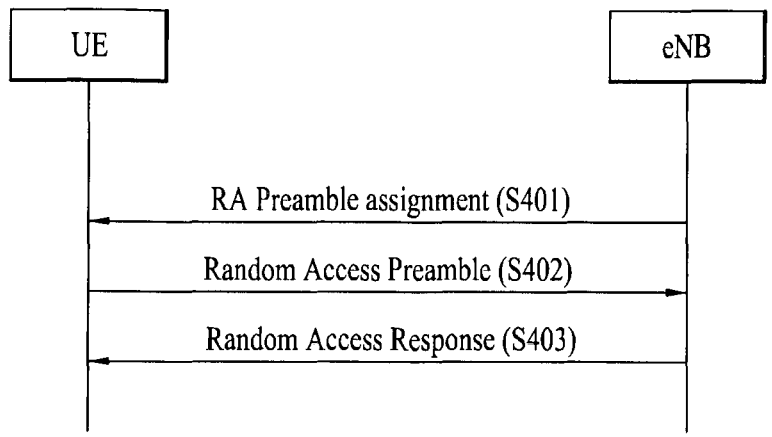
FIG. 8 is a diagram illustrating an operation procedure of a user equipment and a base station during a non-contention based random access procedure.

FIG. 8 is a diagram illustrating an operation procedure of a user equipment and a base station during a non-contention based random access procedure.

(1) Random Access Preamble Assignment

The non-contention based random access procedure can be performed for two cases, i.e., (1) when a handover procedure is performed, and (2) when requested by a command of the base station. Of course, the contention based random access procedure may also be performed for the two cases.

First of all, for non-contention based random access procedure, it is important that the user equipment receives a designated random access preamble having no possibility of contention from the base station. Examples of a method of receiving a random access preamble include a method through a handover command and a method through a PDCCH command. A random access preamble is assigned to the user equipment through the method of receiving a random access preamble (S401).

(2) First Message Transmission

As described above, after receiving a random access preamble designated only for the user equipment, the user equipment transmits the preamble to the base station (S402).

(3) Second Message Reception

After the user equipment transmits the random access preamble in step S402, the base station tries to receive its random access response within a random access response receiving window indicated through system information or handover command (S403). In more detail, the random access response can be transmitted in the form of a MAC protocol data unit (MAC PDU), and the MAC PDU can be transferred through a physical downlink shared channel (PDSCH). Also, it is preferable that the user equipment monitors a physical downlink control channel (PDCCH) to appropriately receive information transferred to the PDSCH. Namely, it is preferable that the PDCCH includes information of a user equipment which should receive the PDSCH, frequency and time information of radio resources of the PDSCH, and a transport format of the PDSCH. If the user equipment successfully receives the PDCCH transmitted thereto, the user equipment can appropriately receive a random access response transmitted to the PDSCH in accordance with the information of the PDCCH. The random access response can include a random access preamble identifier (ID) (for example, random access preamble identifier (RA-RNTI)), uplink grant indicating uplink radio resources, a temporary C-RNTI, and timing advance command (TAC) values.

As described above, the random access preamble identifier is required for the random access response to indicate whether the uplink grant, the temporary C-RNTI and the TAC values are effective for what user equipment as random access response information for one or more user equipments can be included in one random access response. In this case, it is assumed that the user equipment selects a random access preamble identifier corresponding to the random access preamble selected in step S402.

In the non-contention based random access procedure, the user equipment can terminate the random access procedure after determining that the random access procedure has been normally performed by receiving the random access response information.

Figure 9:
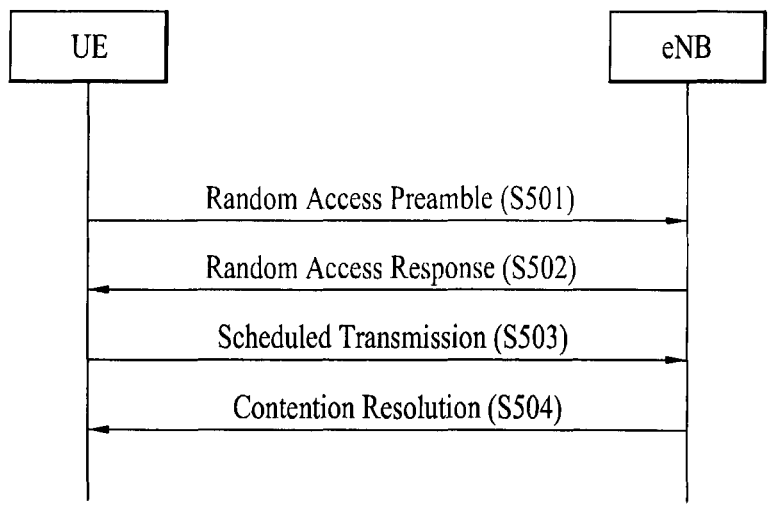
FIG. 9 is a diagram illustrating an operation procedure of a user equipment and a base station during a contention based random access procedure.

FIG. 9 is a diagram illustrating an operation procedure of a user equipment and a base station during a contention based random access procedure.

(1) First Message Transmission

First of all, the user equipment randomly selects one random access preamble from a set of random access preambles indicated through system information or handover command, and selects a physical RACH (PRACH) resource that can transmit the random access preamble (S501).

(2) Second Message Reception

A method of receiving random access response information is similar to that of the aforementioned non-contention based random access procedure. Namely, after the user equipment transmits the random access preamble in step S402, the base station tries to receive its random access response within a random access response receiving window indicated through system information or handover command, and receives the PDSCH through corresponding random access identifier information (S502). In this case, the base station can receive uplink grant, a temporary C-RNTI, and timing advance command (TAC) values.

(3) Third Message Transmission

If the user equipment receives its effective random access response, the user equipment respective processes information included in the random access response. Namely, the user equipment applies TAC and store a temporary C-RNTI. Also, the user equipment transmits data (i.e., third message) to the base station using UL grant (S503). The third message should include a user equipment identifier. This is because that the base station needs to identify user equipments which perform the contention based random access procedure, thereby avoiding contention later.

Two methods have been discussed to include the user equipment identifier in the third message. In the first method, if the user equipment has an effective cell identifier previously assigned from a corresponding cell before the random access procedure, the user equipment transmits its cell identifier through an uplink transport signal corresponding to the UL grant. On the other hand, if the user equipment does not have an effective cell identifier previously assigned from a corresponding cell before the random access procedure, the user equipment transmits its cell identifier including its unique identifier (for example, S-TMSI or random ID). Generally, the unique identifier is longer than the cell identifier. If the user equipment transmits data corresponding to the UL grant, the user equipment starts a contention resolution timer.

(4) Fourth Message Reception

After transmitting data including its identifier through UL grant included in the random access response, the user equipment waits for a command of the base station for contention resolution. Namely, the user equipment tries to receive the PDCCH to receive a specific message (504). Two methods have been discussed to receive the PDCCH. As described above, if the third message is transmitted to correspond to the UL grant using the user equipment identifier, the user equipment tries to receive the PDCCH using its cell identifier. If the user equipment identifier is a unique identifier of the user equipment, the user equipment tries to receive the PDCCH using a temporary cell identifier included in the random access response. Afterwards, in case of the first method, if the user equipment receives the PDCCH through its cell identifier before the contention resolution timer expires, the user equipment determines that the random access procedure has been performed normally, and ends the random access procedure. In case of the second method, if the user equipment receives the PDCCH through the temporary cell identifier before the contention resolution timer expires, the user equipment identifies data transferred from the PDSCH. If the unique identifier of the user equipment is included in the data, the user equipment determines that the random access procedure has been performed normally, and ends the random access procedure.

When the UE is using SF set pattern, it is possible that the UE initiates the above explained random access (RA) procedure. If the UE follows SF set pattern signaled by L1 control information when performing RA procedure, there may be mismatch of UL-DL configuration of the UE and the eNB. This is because the eNB does not know which UE performs RA procedure until the contention resolution is completed, and thus the eNB uses default UL-DL configuration (signaled by SIB) for the RA procedure.

The mismatch of UL-DL configuration in the UE and the eNB may result in various problems such that UE loses UL grant sent by the eNB, UE performs UL transmission in different subframe than the eNB expected, etc.

To avoid the potential problem caused by the above explained mismatch of UL-DL configuration in the UE and the eNB, one aspect of the present invention proposes that when the UE configured with SF set pattern initiates a random access (RA) procedure, the UE suspends the used SF set pattern, and uses default UL-DL configuration signaled in system information (SIB) for the RA procedure.

Figure 10:
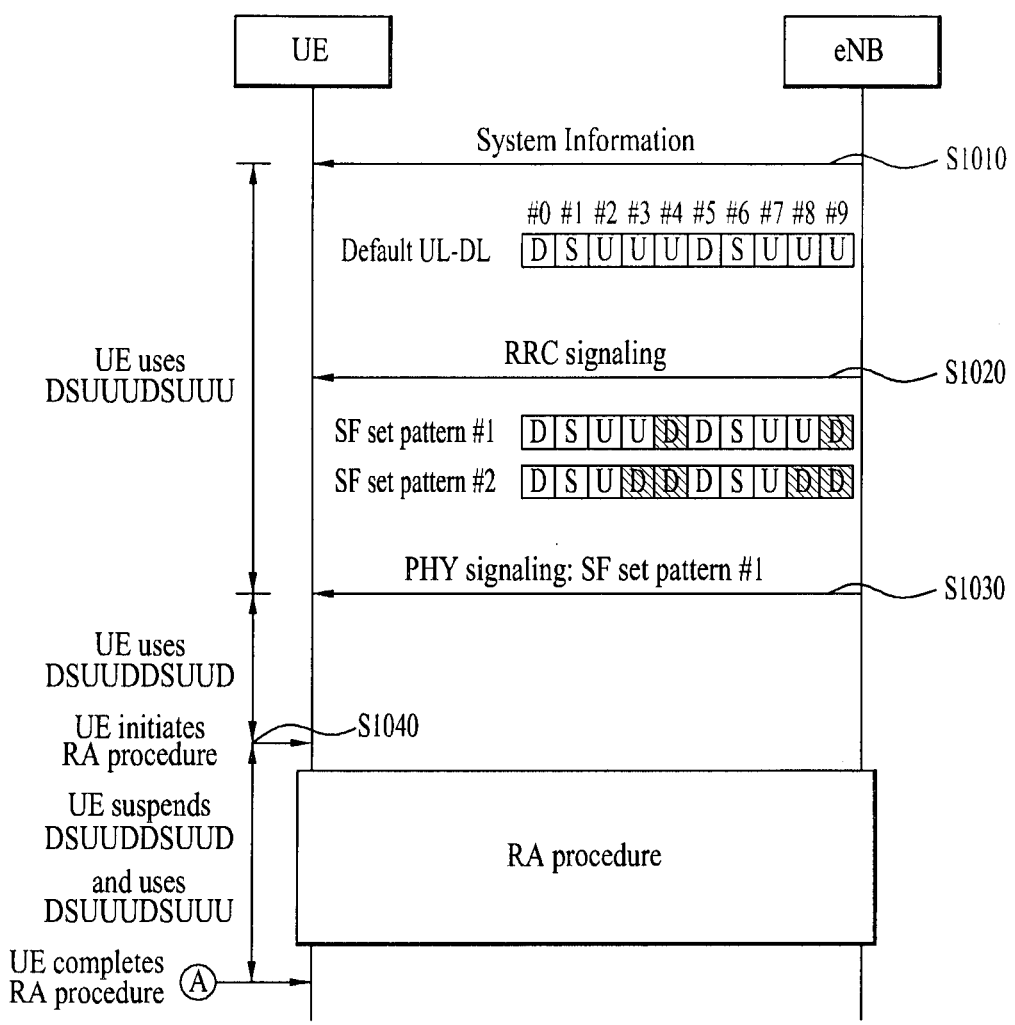
FIG. 10 is a diagram showing a prepared embodiment of the present invention.

FIG. 10 is a diagram showing a prepared embodiment of the present invention.

As explained above, by using eIMTA scheme in TDD system, the TDD UL-DL configuration can be changed based on the amount of traffic in each direction.

First, the default UL-DL configuration for TDD system may be provided in System Information (S1010). This configuration is cell-specific, and does not change unless the cell is reconfigured. Thus, it may be called as default UL-DL configuration. The default UL-DL configuration is the configuration explained above as signaled via System Information Block Type 1.

In this example, the subframes #0 and #5 are downlink subframes based on the default configuration, the subframes #1 and #6 are special subframes (DwPTS) which can also be used for downlink transmission, and the subframes #2, #3, #4, #7, #8, and #9 are uplink subframes. This pattern is applied to each radio frame.

With eIMTA according to one example of the present invention configured, if the eNB wants to increase downlink transmission to a UE, the eNB may provides SF (Subframe)

set pattern information to the UE by the dedicated RRC signaling (e.g. RRC Connection Reconfiguration message) (S1020). The eNB can provide multiple SF set patterns to the UE. In this example, the SF set pattern #1 changes subframes #4 and #9 to DL subframes, and the SF set pattern #2 changes #3, #4, #8, and #9 to DL subframes, compared to the default UL-DL configuration. The eNB may also provide the start time and duration of each SF set pattern.

After providing the SF set pattern information, the eNB can dynamically change the UL-DL configuration of the UE depending on the actual amount of data, or any other system condition. The dynamic change can be realized by PHY signaling such as PDCCH signaling.

In this example, the eNB may transmit L1 signaling to use SF set pattern #1 (S1030) instead of default UL/DL configuration. In this case, the UE may use SF set pattern #1 (DSUUDDSUUD).

While using the SF set pattern #1, the UE may initiates Random Access procedure (S1040). As explained above, the eNB has no idea about a specific UE is to perform random access, thus eNB may expect the reception of random access preamble, etc, based on the default TDD UL/DL configuration.

Therefore, according to the one example of the present invention, the UE suspends the use of SF set pattern #1 during the random access procedure. That is, the UE according to this example use the default TDD UL/DL configuration instead of SF set pattern #1. When suspending the used SF set pattern, the start time and duration are not impacted, i.e. the timer for the SF set pattern is not suspended.

After the completion of the random access procedure, the UE may resume the use of SF set pattern previously used. But, in one example of the present invention, the use of the previously used SF pattern may be different from each other based on the success or failure of the random access procedure.

Figure 11:
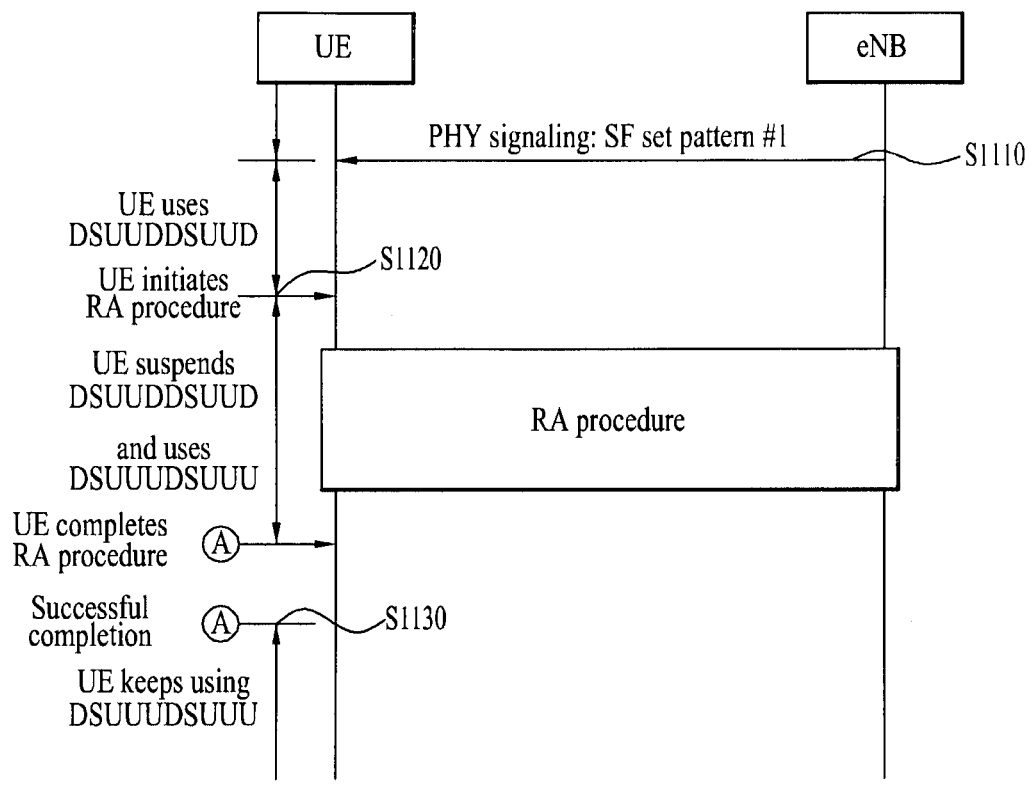
FIG. 11 is a diagram showing an example of the present invention where the random access procedure is successfully completed.

FIG. 11 is a diagram showing an example of the present invention where the random access procedure is successfully completed.

In this example, the eNB signaled to the UE via L1 signaling to use SF set pattern #1 instead of default TDD UL/DL subframe configuration (S1110). While using the SF set pattern #1, the UE may initiates Random access procedure (S1120). As explained above, according to this example of the present invention, the UE suspends the use of SF set pattern during the random access procedure.

When the random access procedure is considered as successfully completed (S1130), the UE of the present example may keep using the default TDD UL/DL subframe configuration until otherwise signalled via L1 signaling. That is, if the UE completes the RA procedure successfully, the UE keeps using the default UL-DL configuration until the eNB sends a PHY signaling to use a SF set pattern.

Figure 12:
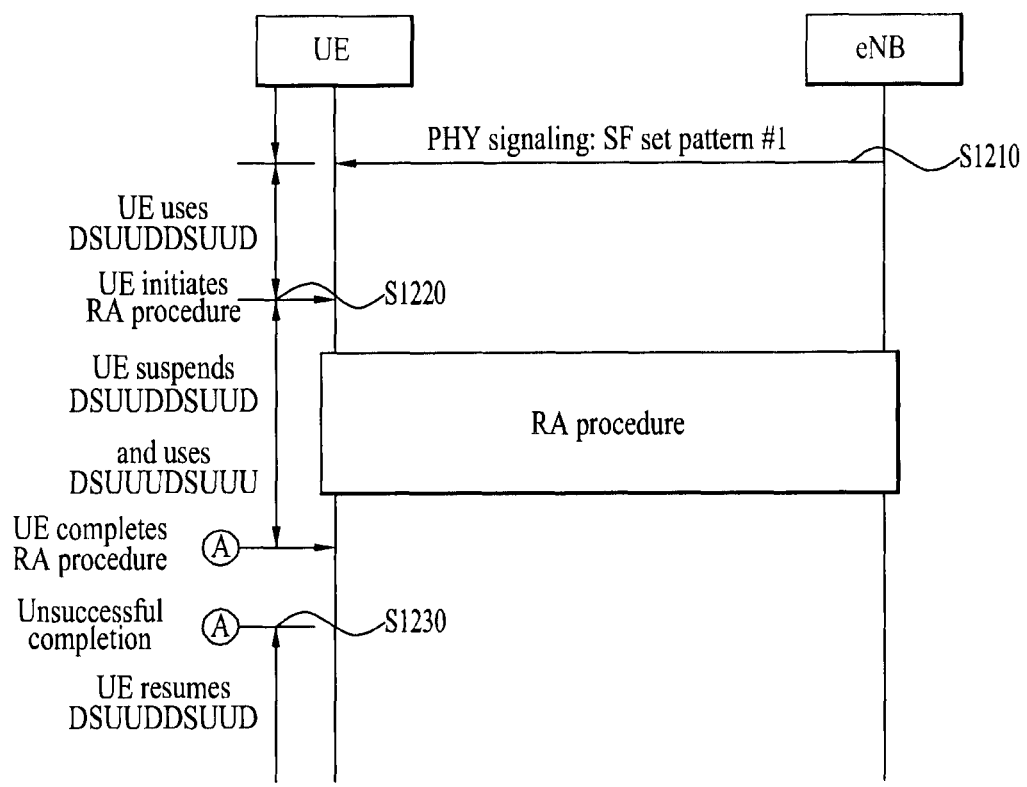
FIG. 12 is a diagram showing an example of the present invention where the random access procedure is unsuccessfully completed.

FIG. 12 is a diagram showing an example of the present invention where the random access procedure is unsuccessfully completed.

The reception of physical signaling to use the SF set pattern #1 (S1210) and the initiation of the random access procedure (S1220) are substantially the same as S1110 and S1120 of FIG. 11. But, in this example, the random access procedure is completed unsuccessfully (S1230). In this case, the UE may resume the use of SF set pattern. That is, if the UE completes the RA procedure unsuccessfully, the UE stops using the default UL-DL configuration and resumes the suspended SF set pattern which was used before performing RA procedure.

Examples of FIGS. 11 and 12 do not limit the scope of the present invention. That is, the use of previously signaled SF set pattern after the completion of the random access procedure may not be based on the success or failure of the random access procedure. The use of the signaled SF set pattern may be limited to a specific action(s) of the UE excluding the random access procedure.

Figure 13:
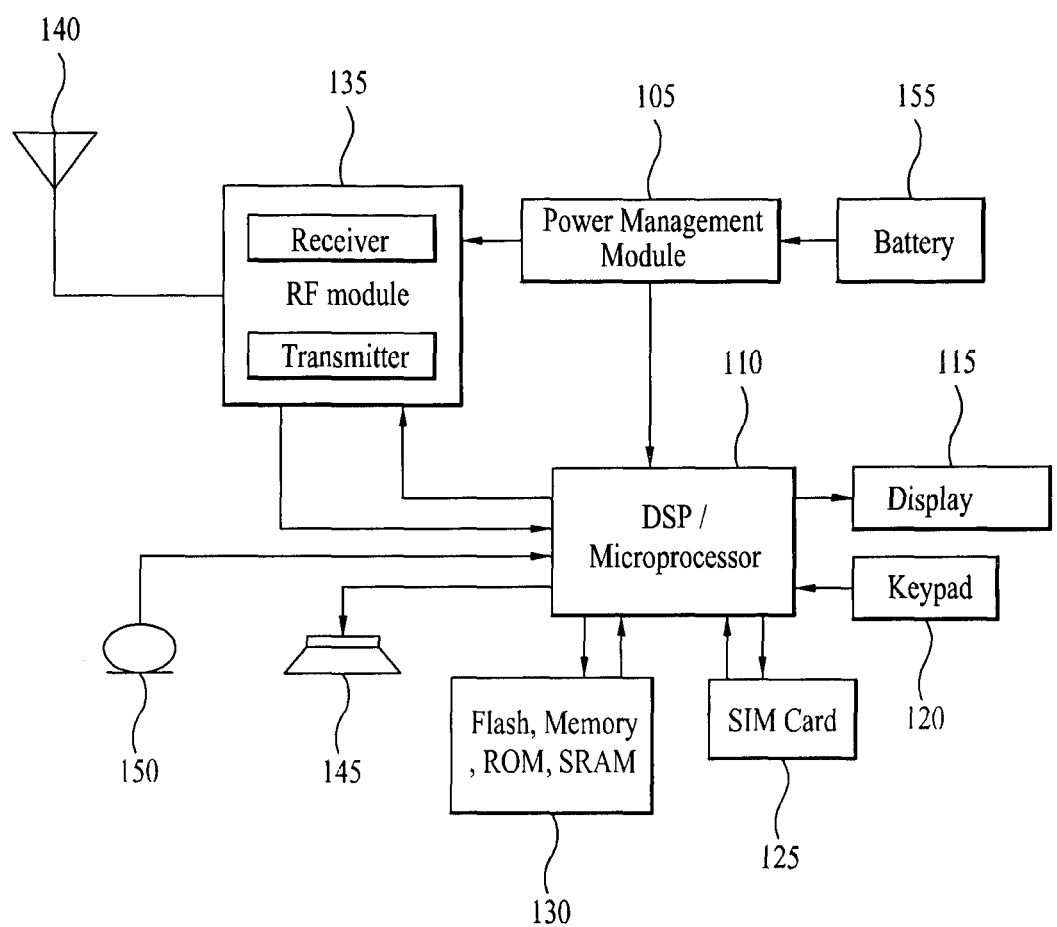
FIG. 13 is a block diagram of a communication apparatus according to an embodiment of the present invention.

FIG. 13 is a block diagram of a communication apparatus according to an embodiment of the present invention.

The apparatus shown in FIG. 13 can be a user equipment (UE) and/or eNB adapted to perform the above mechanism, but it can be any apparatus for performing the same operation.

As shown in FIG. 13, the apparatus may comprises a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 13 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 13 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

The invention claimed is:

1. A method of performing a random access to a network by a user equipment (UE), the method comprising:
   receiving information on a first time division duplex (TDD) uplink/downlink (UL/DL) subframe configuration;
   receiving information on a second TDD UL/DL subframe configuration informing the UE of a change from the first TDD UL/DL subframe configuration;
   communicating with the network based on the second TDD UL/DL subframe configuration;
   performing a random access procedure based on the first TDD UL/DL subframe configuration, when the random access procedure is initiated; and
   communicating with the network based on the second TDD UL/DL subframe configuration, when the random access procedure is completed unsuccessfully.

2. The method of claim 1, further comprising:
   communicating with the network based on the first TDD UL/DL subframe configuration, when the random access procedure is completed successful.

3. The method of claim 1, wherein said communicating with the network comprises:
   monitoring a physical downlink control channel (PDCCH) on one or more downlink subframes according to the first or the second TDD UL/DL subframe configuration.

4. The method of claim 1, wherein said communicating with the network comprises:
   transmitting an uplink signal on one or more uplink subframes according to the first or the second TDD UL/DL subframe configuration.

5. The method of claim 1, wherein the first TDD UL/DL subframe configuration is received via system information.

6. The method of claim 1, wherein the second TDD UL/DL subframe configuration is received via a physical signaling.

7. The method of claim 1, wherein the second TDD UL/DL subframe configuration is more frequently signaled than the first TDD UL/DL subframe configuration.

8. The method of claim 1, wherein the second TDD UL/DL subframe configuration allocates more downlink subframes than the first TDD UL/DL subframe configuration.

9. The method of claim 1, wherein the random access procedure is non contention based random access procedure.

10. A user equipment (UE) performing a random access to a network, the UE comprising:
    a transceiver configured to receive information on a first time division duplex (TDD) uplink/downlink (UL/DL) subframe configuration and information on a second TDD UL/DL subframe configuration informing the UE of a change from the first TDD UL/DL subframe configuration; and
    a processor connected to the transceiver and configured to perform a random access procedure based on the first TDD UL/DL subframe configuration, when the random access procedure is initiated while communicate with the network based on the second TDD UL/DL subframe configuration,
    wherein the processor is further configured to communicate with the network based on the second TDD UL/DL subframe configuration, when the random access procedure is completed unsuccessfully.

11. The UE of claim 10, wherein the processor is further configured to communicate with the network based on the first TDD UL/DL subframe configuration, when the random access procedure is completed successful.

12. The UE of claim 10, wherein the first TDD UL/DL subframe configuration is received via system information.

13. The UE of claim 10, wherein the second TDD UL/DL subframe configuration is received via a physical signaling.

14. The UE of claim 10, wherein the second TDD UL/DL subframe configuration is more frequently signaled than the first TDD UL/DL subframe configuration.

15. The UE of claim 10, wherein the second TDD UL/DL subframe configuration allocates more downlink subframes than the first TDD UL/DL subframe configuration.

* * * * *